United States Patent
Saha et al.

(10) Patent No.: US 10,163,257 B2
(45) Date of Patent: Dec. 25, 2018

(54) CONSTRUCTING A 3D STRUCTURE

(71) Applicant: Tata Consultancy Services Limited, Mumbai (IN)

(72) Inventors: Arindam Saha, Kolkata (IN); Brojeshwar Bhowmick, Kolkata (IN); Aniruddha Sinha, Kolkata (IN)

(73) Assignee: Tata Consultancy Services Limited, Mumbai (IN)

( * ) Notice: Subject to any disclaimer, the term of this patent is extended or adjusted under 35 U.S.C. 154(b) by 107 days.

(21) Appl. No.: 15/316,704

(22) PCT Filed: Dec. 29, 2014

(86) PCT No.: PCT/IB2014/067375
§ 371 (c)(1),
(2) Date: Dec. 6, 2016

(87) PCT Pub. No.: WO2015/185968
PCT Pub. Date: Dec. 10, 2015

(65) Prior Publication Data
US 2017/0200307 A1    Jul. 13, 2017

(30) Foreign Application Priority Data
Jun. 6, 2014 (IN) .......................... 1873/MUM/2014

(51) Int. Cl.
*G06T 17/00* (2006.01)
*G06T 17/10* (2006.01)
*G06T 7/593* (2017.01)

(52) U.S. Cl.
CPC ............. *G06T 17/10* (2013.01); *G06T 7/593* (2017.01); *G06T 17/00* (2013.01);
(Continued)

(58) Field of Classification Search
CPC ................. G06T 17/10; G06T 2200/08; G06T 2210/56; G06T 17/00; G06T 7/593; G06T 2207/10016
See application file for complete search history.

(56) References Cited

U.S. PATENT DOCUMENTS

| 2012/0120072 A1 | 5/2012 | Se et al. |
| 2014/0002455 A1 | 1/2014 | Senften et al. |
| 2014/0015924 A1 | 1/2014 | Pryor |

OTHER PUBLICATIONS

Falkingham, "Acquisition of high resolution three-dimensional models using free, open-source, photogrammetric software" Palaeontologia Electronica, http:palaeo-electronica.org, Research Gate, vol. 15, issue 1, (2012), https://www.researchgate.net/publication/225683089_Acquisition_of_high_resolution_three-dimensional_models_using_free_open-source_photogrammetric_software.

(Continued)

*Primary Examiner* — Robert J Craddock
(74) *Attorney, Agent, or Firm* — Finnegan, Henderson, Farabow, Garrett & Dunner LLP

(57) ABSTRACT

The present subject matter discloses a system and a method for constructing a 3D structure. A stream of images having timestamps associated is received at first. A plurality of image sub-groups is created using the stream of images. The plurality of image sub-groups are used for extracting features of the images present in the image sub-groups. The features are used for generating point correspondences between the images. Epipolar geometries for the image sub-groups are calculated for filtering of the point correspondences, and generating filtered point correspondences. Further, 3D points representing one or more 3D point structures are generated using the filtered point correspondences. A registered 3D structure is constructed using the one or more 3D structures upon considering a scale correction and transformation between the one or more 3D struc- (Continued)

tures. Further, the registered 3D structure is dense reconstructed for improving the pixel density of the 3D structure.

16 Claims, 7 Drawing Sheets

(52) U.S. Cl.
CPC ............... *G06T 2200/08* (2013.01); *G06T 2207/10016* (2013.01); *G06T 2210/56* (2013.01)

(56) References Cited

OTHER PUBLICATIONS

International Search Report, from the U.S. Patent and Trademark Office in corresponding PCT Application No. PCT/IB2014/067375, dated May 27, 2015.

CONSTRUCTING A 3D STRUCTURE

CROSS-REFERENCE TO RELATED APPLICATIONS AND PRIORITY

The present application does not claim priority from any patent application.

TECHNICAL FIELD

The present subject matter described herein, in general, relates to constructing a 3-Dimensional (3D) structure, more specifically, the present subject matter relates to generating the 3D structure from a plurality of 2D images.

BACKGROUND

Processing 2D images to generate a 3D structure is known from several techniques. However, a process of constructing a 3D structure of an object is very complex and involves enormous data processing. This is because, in order to construct a 3D structure, several images of the object may be recorded/captured by image capturing devices, such as a digital camera and processing these images involves complex computations. In one example, the images may be captured from different viewpoints to gather as much information as possible about the object.

Conventionally, the image capturing devices possess a limited processing capability and cannot handle complex data processing. Therefore, after the images are captured by the image capturing devices, the images may be transmitted to a remote server. Upon receiving the images, the remote server may store the images. The remote server, prior to commencing the processing of the images, may wait until all the images are stored. After receiving and storing all the images, the remote server may start processing the images.

The images may be processed by the remote server for constructing a 3D structure. However, one must understand that before actually commencing the processing of the images, the server may consume a lot of time to receive and store all the images. This time may be added to an overall time for constructing the 3D structure from the images by the remote server.

SUMMARY

This summary is provided to introduce aspects related to systems and methods for constructing a 3D structure and the aspects are further described below in the detailed description. This summary is not intended to identify essential features of subject matter nor is it intended for use in determining or limiting the scope of the subject matter.

In one implementation, a system for constructing a 3D structure is disclosed. The system comprises a processor and a memory coupled to the processor for executing a plurality of modules stored in the memory. The plurality of modules comprises an imaging module, a correspondence generating and filtering module, a 3D module, an optimizing module, a registering module, and a dense reconstructing module. The imaging module may receive a stream of images captured from a plurality of viewpoints, wherein each image of the stream of images has a timestamp associated. The imaging module may create a plurality of image sub-groups from the stream of images based upon the timestamps. The imaging module may extract features from an image sub-group of the plurality of image sub-groups. Further, the correspondence generating and filtering module may generate point correspondences between the images present in the image sub-group based on the features. The correspondence generating and filtering module may compute epipolar geometry of the image sub-group. The correspondence generating and filtering module may filter false point correspondences (outliers) from the point correspondences using the epipolar geometry for generating filtered point correspondences. Further, the 3D module may generate 3D points by employing a triangulation technique on the filtered point correspondences, wherein the 3D points represent one or more 3D structures. Further, the optimizing module may optimize the one or more 3D structures for minimizing reprojection errors associated with the 3D points. Further, the registering module may register/merge the one or more 3D structures based upon a scale correction and a rigid transformation between the one or more 3D structures. Further, the dense reconstructing module may reconstruct a dense 3D structure using a Clustering views for Multi-View Stereo (CMVS) technique.

In another implementation, a method for constructing a 3D structure is disclosed. The method comprises a step of receiving a stream of images captured from a plurality of viewpoints. Further, each image of the stream of images has a timestamp associated. The method may further comprise creating a plurality of image sub-groups from the stream of images based upon the timestamps. The method may further comprise extracting features from an image sub-group of the plurality of image sub-groups. Upon extraction of the features, point correspondences between the images may be generated, wherein the images are from the image sub-group. The method may further comprise computing epipolar geometry of the image sub-group. The method may further comprise filtering the point correspondences using the epipolar geometry for generating filtered point correspondences. The method may further comprise generating 3D points using the filtered point correspondences by employing a triangulation technique. The 3D points represent one or more 3D structure. The method may further comprise optimizing the one or more 3D structures for minimizing reprojection errors associated with the 3D points. The method may further comprise registering the one or more 3D structures for constructing a registered 3D structure, upon considering a scale correction and a rigid transformation between the 3D point clouds. Further, the receiving, the creating, the extracting, the generating, the computing, the filtering, the generating, the optimizing, the registering, and the dense reconstructing are performed by a processor.

Yet in another implementation, a non-transitory computer readable medium embodying a program executable in a computing device for constructing a 3D structure is disclosed. The program comprises a program code for receiving a stream of images captured from a plurality of viewpoints, wherein the stream of images has timestamps associated. The program further comprises a program code for creating a plurality of image sub-groups based on the timestamps. The program further comprises a program code for extracting features from an image sub-group of the plurality of image sub-groups. The program further comprises a program code for generating point correspondences between the images present in the image sub-group. The program further comprises a program code for computing epipolar geometry of the image sub-group. The program further comprises a program code for filtering the point correspondences for generating filtered point correspondences. The program further comprises a program code for generating 3D points representing one or more 3D structure, using the filtered point correspondences.

BRIEF DESCRIPTION OF THE DRAWINGS

The detailed description is described with reference to the accompanying figures. In the figures, the left-most digit(s) of a reference number identifies the figure in which the reference number first appears. The same numbers are used throughout the drawings to refer like features and components.

DETAILED DESCRIPTION

Systems and methods for constructing a 3D structure are described. In order to construct a 3D structure of an object, images of the object are captured from a plurality of viewpoints. The images may correspond to a stream of images. The images present in the stream of images may be captured with timestamps. The images present in the stream of images may be captured from different viewing angles in order to collect maximum details about the object. The stream of images may be transferred continuously to a system.

The system may continuously receive the stream of images. The stream of images may be grouped into a plurality of image sub-groups. The images captured within a time limit, may contain similar information. The images containing similar information may be grouped into an image sub-group of the plurality of image sub-groups, using the timestamps. The image sub-groups may then be processed for extracting features from the images of the image sub-groups. Further point correspondences may be generated between the images of the image sub-groups, based upon the features. The point correspondences may be generated upon matching similar features present in the images of the image sub-groups.

Further, epipolar geometry for the image sub-groups may be calculated and may be used for filtering the point correspondences. The point correspondences may contain false point correspondences (outliers) that may be filtered out using the epipolar geometry, for generating filtered point correspondences. The filtered point correspondences of the image sub-groups may be triangulated for generating 3D points, wherein the 3D points represent one or more 3D structures. The one or more 3D structures may further be optimized for eliminating reprojection errors associated with the 3D points.

The one or more 3D structures upon optimization may be registered/merged for generating a registered 3D structure. The one or more 3D structures may be registered upon considering a scale correction between the one or more 3D structures. Further, a rigid transformation (rotation, translation, and centroid) associated with the one or more 3D structures may also be considered before registering the one or more 3D structures. Finally, the registered 3D structure may be dense reconstructed using a suitable technique, for generating a dense 3D structure.

While aspects of described system and method for constructing a 3D structure may be implemented in any number of different computing systems, environments, and/or configurations, the embodiments are described in the context of the following exemplary system.

Figure 1:
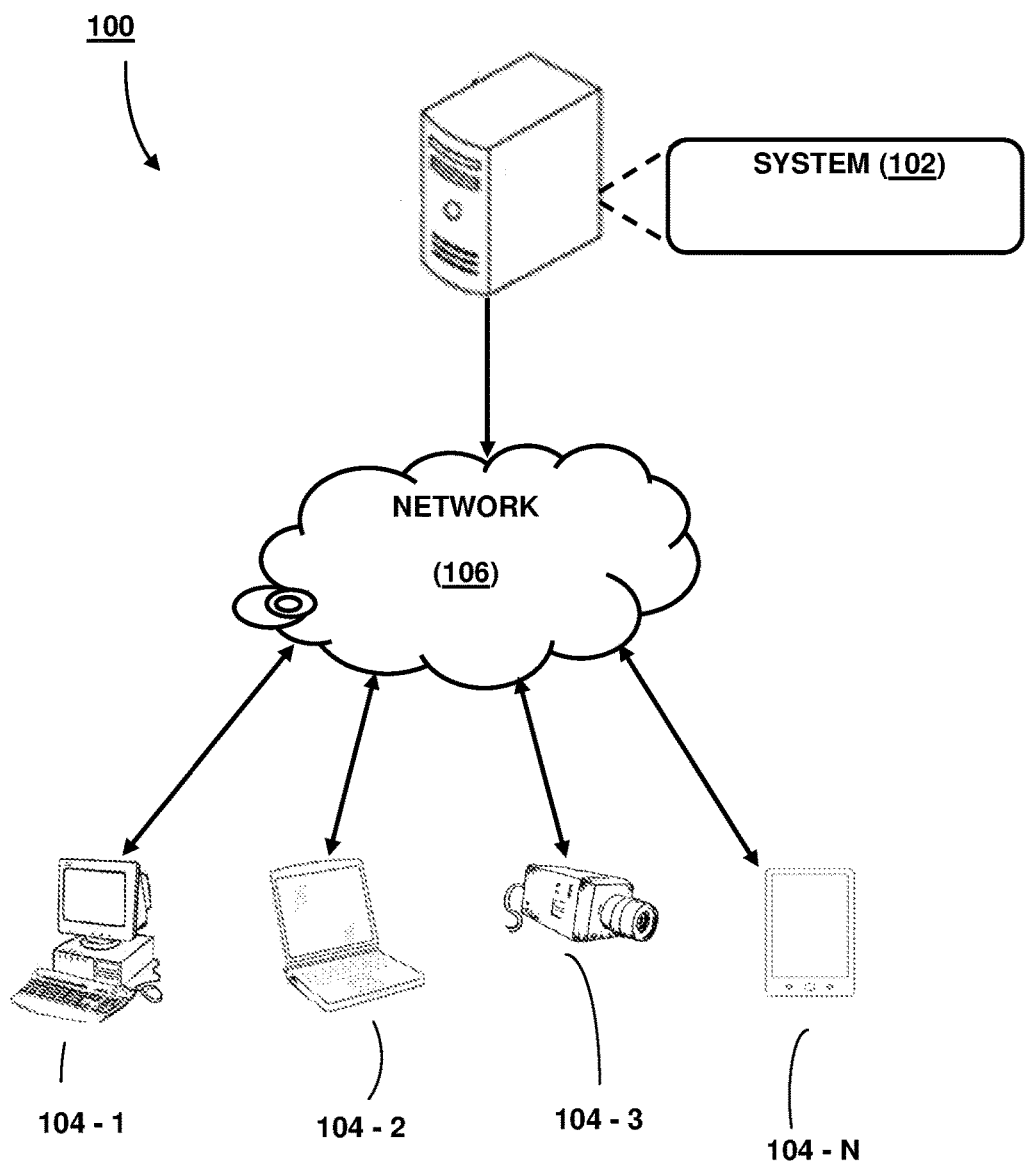
FIG. 1 illustrates a network implementation of a system for constructing a 3D structure, in accordance with an embodiment of the present subject matter.

Referring to FIG. 1, a network implementation 100 of a system 102 for constructing a 3D structure is illustrated, in accordance with an embodiment of the present subject matter. In one embodiment, the system 102 may facilitate the construction of the 3D structure. The system 102 may receive the stream of images from a user device 104. The system 102 may process the stream of images for generating the one or more 3D structures. The one or more 3D structures may be registered by the system 102 for constructing the registered 3D structure. The registered 3D structure is generally sparse and may require the operation of dense reconstruction to be performed. Upon performing the process of dense reconstruction, the dense 3D structure may be obtained by the system 102.

Although the present subject matter is explained considering that the system 102 is implemented for constructing the 3D structure, it may be understood that the system 102 may also be implemented in a variety of computing systems, such as a laptop computer, a desktop computer, a notebook, a workstation, a mainframe computer, a server, a network server, a tablet, a mobile phone, and the like. In one embodiment, the system 102 may be implemented in a cloud-based environment. It will be understood that the system 102 may be accessed by multiple users through one or more user devices 104-1, 104-2 . . . 104-N, collectively referred to as user device 104 hereinafter, or applications residing on the user device 104. Examples of the user device 104 may include, but are not limited to, a portable computer with a webcam, a personal digital assistant with a camera, a handheld device with a camera, and a digital camera. The user device 104 is communicatively coupled to the system 102 through a network 106.

In one implementation, the network 106 may be a wireless network, a wired network or a combination thereof. The network 106 can be implemented as one of the different types of networks, such as intranet, local area network (LAN), wide area network (WAN), the internet, and the like. The network 106 may either be a dedicated network or a shared network. The shared network represents an association of the different types of networks that use a variety of protocols, for example, Hypertext Transfer Protocol (HTTP), Transmission Control Protocol/Internet Protocol (TCP/IP), Wireless Application Protocol (WAP), and the like, to communicate with one another. Further the network 106 may include a variety of network devices, including routers, bridges, servers, computing devices, storage devices, and the like.

Figure 2:
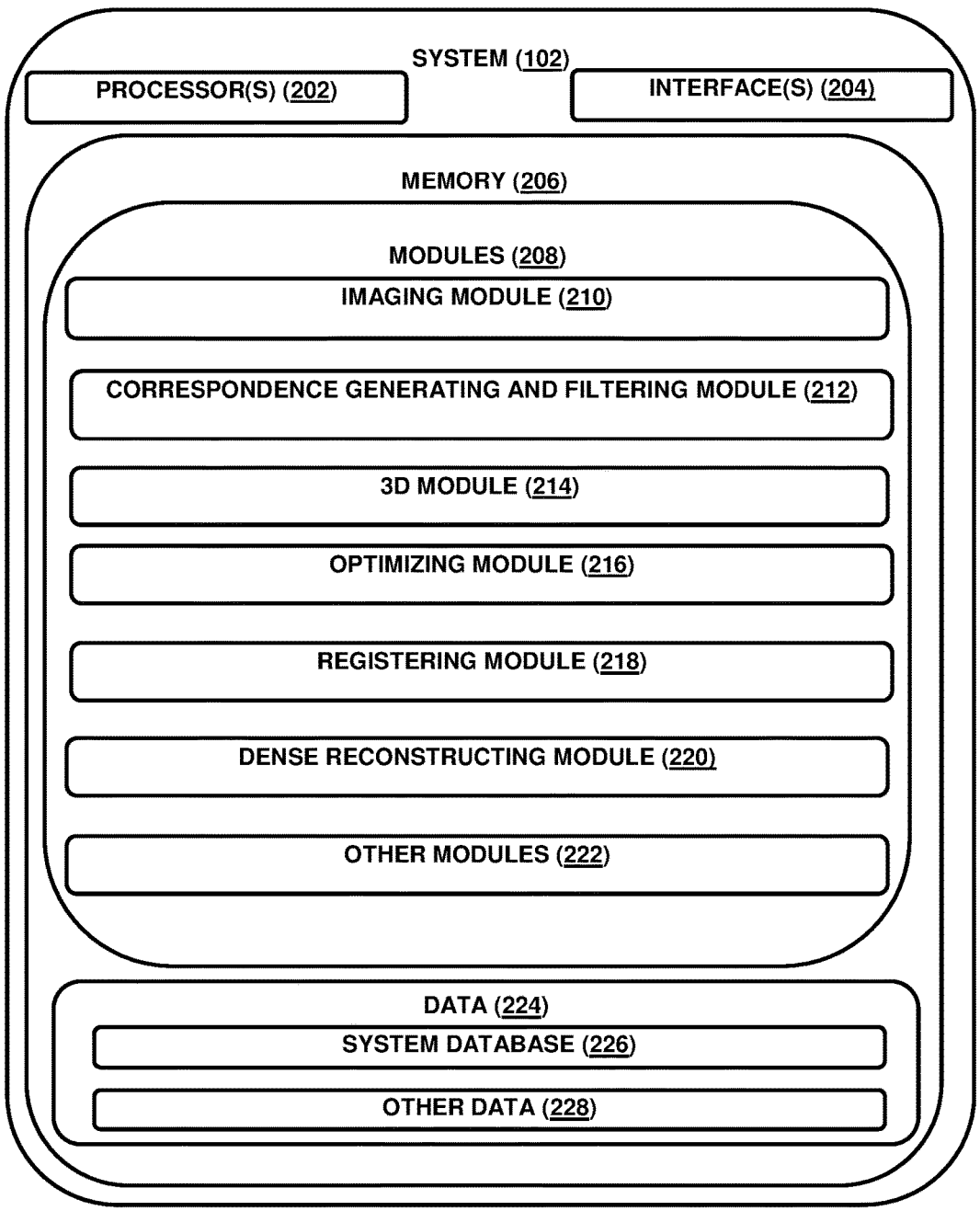
FIG. 2 illustrates the system of FIG. 1, in accordance with an embodiment of the present subject matter.

Referring now to FIG. 2, the system 102 is illustrated in accordance with an embodiment of the present subject matter. In one embodiment, the system 102 may include at least one processor 202, an input/output (I/O) interface 204, and a memory 206. The at least one processor 202 may be implemented as one or more microprocessors, microcomputers, microcontrollers, digital signal processors, central processing units, state machines, logic circuitries, and/or any devices that manipulate signals based on operational instructions. Further, the at least one processor 202 comprises a multi-core architecture. Among other capabilities, the at least one processor 202 is configured to fetch and execute computer-readable instructions or modules stored in the memory 206.

The I/O interface 204 may include a variety of software and hardware interfaces, for example, a web interface, a graphical user interface, and the like. The I/O interface 204 may allow the system 102 to interact with a user directly or through the user devices 104. Further, the I/O interface 204 may enable the system 102 to communicate with other computing devices, such as web servers and external data servers (not shown). The I/O interface 204 can facilitate multiple communications within a wide variety of networks and protocol types, including wired networks, for example, LAN, cable, etc., and wireless networks, such as WLAN, cellular, or satellite. The I/O interface 204 may include one or more ports for connecting a number of devices to one another or to another server.

The memory 206 may include any computer-readable medium or computer program product known in the art including, for example, volatile memory, such as static random access memory (SRAM) and dynamic random access memory (DRAM), and/or non-volatile memory, such as read only memory (ROM), erasable programmable ROM, flash memories, hard disks, optical disks, a compact disks (CDs), digital versatile disc or digital video disc (DVDs) and magnetic tapes. The memory 206 may include modules 208 and data 224.

The modules 208 include routines, programs, objects, components, data structures, etc., which perform particular tasks or implement particular abstract data types. In one implementation, the modules 208 may include an imaging module 210, a correspondence generating and filtering (CGF) module 212, a 3D module 214, an optimizing module 216, a registering module 218, a dense reconstructing module 220, and other modules 222. The other modules 222 may include programs or coded instructions that supplement applications and functions of the system 102.

The data 224, amongst other things, serves as a repository for storing data processed, received, and generated by one or more of the modules 208. The data 224 may also include a system database 226, and other data 228. The other data 228 may include data generated as a result of the execution of one or more modules in the other modules 222.

In one implementation, at first, a user may use the user device 104 for capturing images of an object, wherein the images are captured with timestamps. In one example, the user device may be a digital camera. It may be understood that the user device 104 and the object need to be stationary while the user device captures a stream of images of the object. In one embodiment, an accelerometer may be embedded with the user device for monitoring a motion of the user device 104, such that the user device 104 captures the stream of images only when the user device 104 is stationary and has undergone a translation of at least a threshold distance. Capturing the stream of images when the user device 104 is stationary may allow the stream of images to be captured with appropriate focus.

The accelerometer may determine the motion of the user device 104 upon determining acceleration (f) of the user device 104. The acceleration (f) defines the rate of change of velocity of the user device 104, and thus determines the motion of the user device 104. Further, the accelerometer may require a calibration of settings for adjusting a bias (B). The bias (B) may be present in the acceleration recorded by the accelerometer if not calibrated appropriately. The bias (B) may refer to a non-zero value of the acceleration recorded by the accelerometer when the user device 104 is static. The bias (B) may be calculated using a below mentioned equation 1, where symbols have their usual meanings, $$B = \frac{1}{N}\sum_{i=0}^{N} r_i(a_i - g_i)$$ (Equation 1)

Here, 'N' represents a total number of images captured while the user device 104 is static, '$r_i$' represents a rotation matrix of world with respect to the user device 104 for $i^{th}$ image, '$a_i$' represents the acceleration of the user device 104 for the $i^{th}$ image, and '$g_i$' represents gravity vector of the user device 104 for the $i^{th}$ image. Thus the acceleration of the user device 104 may be calculated upon calibrating the accelerometer for the bias (B), wherein the bias (B) is calculated using the above equation 1.

Further, the user device 104 may capture the stream of images (hereinafter interchangeably referred to as 'images') of the object from a plurality of viewpoints/locations for capturing maximum details of the object in the images. The different locations of the user device 104 may be displaced at least by a threshold distance in a 3D space. The threshold distance may be measured in any direction of the user device 104 present in the 3D space. The threshold distance may be calculated with respect to an initial position of the user device 104. The images captured by the user device 104 from locations within the threshold distance may include similar image details. To avoid capturing the similar image details, consecutive images are captured by the user device 104 once the user device 104 moves by the threshold distance. In an example, the threshold distance may be 8 inches in an x-y-z plane or the 3D space. The user device 104 having captured an image at a first location may capture another image by moving to a second location, wherein the second location may be at a distance of at least 8 inches from the first location.

For capturing the images one after another, a movement of the user device 104 may be determined using an Equation 2 and an Equation 3, shown below, where symbols have their usual meanings, $$s = ut + \tfrac{1}{2}ft^2$$ (Equation 2)

$$v = u + ft$$ (Equation 3)

Here, 's' denotes displacement of the user device 104, 'f' represents the acceleration of the user device 104 captured by the accelerometer upon calibration, 'u' denotes initial velocity of displacement of the user device 104 between two positions/locations, and 'v' denotes final velocity of a previous displacement of the user device 104. The initial velocity (u) of the displacement of the user device 104 is considered as a mean value of the final velocity (v) of the previous displacement of the user device 104 and zero.

The user device 104 upon determining the acceleration and movement of the user device 104 may capture images one after another. In an example, the user device 104 may capture the images in Joint Photographic Experts Group (JPEG) format. The images when present in the JPEG format are usually of smaller sizes and require less time when transmitted over the network 106.

In accordance with an embodiment of the present disclosure, the images may be compressed for reducing a size of the images. The images may be compressed without affecting quality of the images. In an example, the images may be compressed up to 70 times using a lossy JPEG 2000 compression technique. The images upon compression may be transmitted to the system 102 for further processing of the images. Transmitting the images to the system 102 upon compression may improve an overall time required for the construction of the 3D structure. In an example, Fourth Generation—Long Term Evolution (4G LTE) network may be used for transmitting the images from the user device 104 to the system 102. The process of compressing the images and transmitting the images across a high bandwidth network helps in achieving a near real time performance of the complete process of constructing the 3D structure.

In accordance with an embodiment of the present disclosure, the imaging module 210 may receive the images. The imaging module 210 may perform a decompression operation on the images for reverting to their original sizes. Further, the imaging module 210 may group the images into a plurality of image sub-groups based on different criteria(s). For example, the imaging module 210 may create the plurality of image sub-groups based on the timestamps present on the images. Each image sub-group may comprise images having similar features. The images having timestamps within a predefined range of time may be grouped into an image sub-group. In one embodiment, the images are grouped into the plurality of image sub-groups for performing parallel processing of the plurality of image sub-groups. Parallel processing of the image sub-groups may further improve the overall time required for constructing the 3D structure.

Further, the imaging module 210 may extract the features from each image sub-group of the plurality of image sub-groups. The features may comprise information like an edge (line segment joining two vertices of the object), orientation of the edge, corners, ridges, blobs (region of a digital image with known properties), color of a specific region, or any other interest point in the images. The features may be extracted from the plurality of image sub-groups using a suitable technique. In one example, the technique may be selected from the group consisting of a Scale Invariant Feature Transform (SIFT), a Speeded Up Robust Features (SURF), a Gradient Location and Orientation Histogram (GLOH), and a Histogram of Oriented Gradients (HOG). In an example, the imaging module 210 may use a SIFT technique for extracting the features from each image sub-group of the plurality of image sub-groups.

After extracting the features from each image sub-group, system 102 may employ the correspondence generating and filtering (CGF) module 212 to generate the point correspondences between the images present in the image sub-group using the features. The point correspondences refer to determining a portion of a first image that corresponds to a portion of a second image, wherein the second image may be different than the first image. Thus, the point correspondences are indicative of the features common between the images of the image sub-groups. The differences between the first image and the second image may exist due to movement of the user device 104, the elapse of time, or movement of the object in the images. Generating the point correspondences leads to establishing relations between the features of the images. In one example, the CGF module 212 may use an Approximate Nearest Neighbor (ANN) library for matching the features among the images in an image sub-group to determine the point correspondences. The ANN library may be stored at the system database 226. The ANN library may include rules for determining a nearest neighbor for the features of the images. A distance between the features of the images may be calculated for determining the nearest neighbor using a distance function. In an example, the distance function may be represented in the form of a Euclidean distance.

The CGF module 212 may generate the point correspondences, in parallel, for the images present in the image sub-group. Parallel generation of the point correspondences in the images present in the image sub-groups further improves the overall time required for constructing the 3D structure.

Further, the CGF module 212 may filter the point correspondences. The point correspondences generated by the CGF module 212 may include true point correspondences/inliers and false point correspondences/outliers. The mismatched point correspondences generated by the CGF module 212 are identified as the false point correspondences/outliers and remaining point correspondences excluding the outliers are identified as inliers. The false point correspondences may be filtered out using the epipolar geometry of the image sub-groups. Specifically, at first, the CGF module 212 may compute the epipolar geometry of the image sub-groups. The epipolar geometry may be computed using the point correspondences established between the images. The epipolar geometry describes a geometric relationship between the images of the object, wherein the images may be captured by the user device 104 from different views/locations. The epipolar geometry comprises a fundamental matrix and an essential matrix. The fundamental matrix and the essential matrix may be the matrices of an order 3*3 defining the geometric relationship between the images. The fundamental matrix and the essential matrix comprise of a rotation (R) and a translation (t) related to the user device 104. Further, the essential matrix is a calibrated version of the fundamental matrix. The essential matrix equals the fundamental matrix multiplied with an intrinsic matrix, wherein the intrinsic matrix comprises camera parameters of the user device 104.

The CGF module 212 may block the false point correspondences, by applying the point correspondences to an Equation 4 and an Equation 5, as mentioned below, $$x'^T F x = 0 \qquad \text{(Equation 4)}$$

$$x^T F^T x' = 0 \qquad \text{(Equation 5)}$$

Here, F denotes the fundamental matrix. x' and x are two points of the images that correspond to each other and form a point correspondence. $x'^T$ and $x^T$ denote a transpose of the points x' and x respectively. The point correspondences not satisfying the equation 4 or the equation 5 are identified as false point correspondences and are blocked. The point correspondences satisfying the equation 4 or the equation 5 are identified as filtered point correspondences and are used for generating the 3D points.

Figure 3:
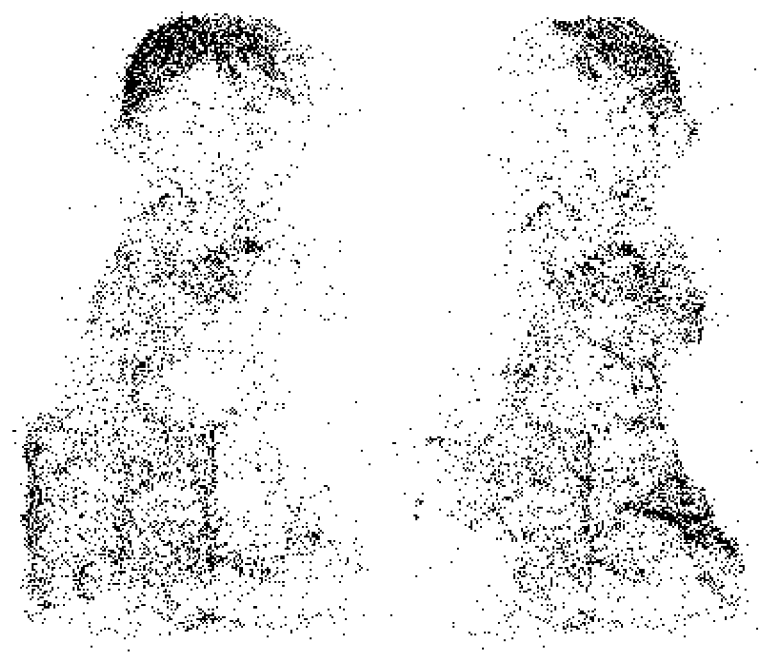
FIG. 3 illustrates a 3D structure, in accordance with an embodiment of the present subject matter.

Post filtering the point correspondences, the system 102 may employ the 3D module 214 to process the filtered point correspondences related to each of the image sub-groups for generating the 3D points. The 3D module 214 may employ a triangulation technique for generating the 3D points from the filtered point correspondences. Thus, the filtered point correspondences comprised by the each image sub-group are applied to the triangulation technique. At first, the triangulation technique involves projecting the filtered point correspondences for estimating 3D points/3D space points/structure points. The 3D points estimated using the filtered point correspondences may represent the one or more 3D structures. The 3D module 214A generates 3D points corresponding to each of the image sub-group and thus multiple 3D structures may be generated from the image sub-groups as shown in FIG. 3. Further, the system 102 may process the different image sub-groups in parallel for generating the multiple 3D structures. Parallel generation of the multiple 3D structures further improve the overall time required for constructing the 3D structure.

Based upon the one or more 3D structures generated for each image sub-group, the registering module 218 may finally construct the registered 3D structure by registering/merging the one or more 3D structures. Each of the one or more 3D structures includes different world coordinates (rigid transformation) and has a scale difference (scale correction). Thus, the one or more 3D structures are merged after considering the scale correction and the rigid transformation between the one or more 3D structures. The one or more 3D structures generated using the filtered point correspondences of the images that are similar, includes common 3D points. The registering module 218 uses the common 3D points for determining the scale correction between the one or more 3D structures.

In an example, a pair of 3D points between a 3D structure A and a 3D structure B is represented as $(XA_1, XA_2)$ and $(XB_1, XB_2)$. The registering module 218 calculates the Euclidean distance D1 between the coordinate $XA_1$ and the coordinate $XA_2$, and the Euclidean distance D2 between the coordinate $XB_1$ (a first 3D space point) and the coordinate $XB_2$ (a second 3D space point). The scale correction ($\lambda$) may be calculated using an below mentioned Equation 6, $$\lambda = \frac{D1}{D2} \qquad \text{(Equation 6)}$$

In one embodiment, the 3D module 214 may calculate the scale correction using thousands of 3D points having minimum reprojection errors. The registering module 218 may calculate an average value of the scale correction calculated using the thousands of 3D points. The average value of the scale correction may then be used for registering/merging the one or more 3D structures.

After calculating the scale correction between the one or more 3D structures, system 102 may employ the registering module 218 to compute the rigid transformation between the one or more 3D structures. Computation of the rigid transformation involves the calculation of three parameters related to the one or more 3D structures. The three parameters include the rotation (R), the translation (t), and a centroid related to each of the one or more 3D structures. The rotation and the translation of the user device 104 while capturing the images correspond to the rotation and the translation of the one or more 3D structures. In an example, the rigid transformation between the 3D structure A and the 3D structure B may be expressed using an Equation 7 as mentioned below, $$B=(R*A)+t \qquad \text{(Equation 7)}$$

Here 'R' denotes the rotation, and 't' denotes the translation. 'R' and T may be expressed in a matrix form. 'R' and T are collectively referred to as transforms. The transforms are applied to the 3D structure A, for aligning the 3D structure A with respect to the 3D structure B. Further, the 3D module 214 may calculate the centroid for the 3D structure A and the 3D structure B using an Equation 8 and Equation 9 as mentioned below, $$centroid_A = \frac{1}{N}\sum_{i=1}^{N} P_A^i \qquad \text{(Equation 8)}$$

$$centroid_B = \frac{1}{N}\sum_{i=1}^{N} P_B^i \qquad \text{(Equation 9)}$$

Here, $P_A$ denotes the 3D points contained by the 3D structure A, and $P_B$ denotes the 3D points contained by the 3D structure B.

Post calculating the centroid, the 3D module 214 may compute the rotation (R) using a Singular Value Decomposition (SVD) technique. The SVD technique is employed using equations 10, 11, and 12, as mentioned below $$H=\Sigma_{i=1}^{N}(P_A^i-centroid_A)(P_B^i-centroid_B)^T \qquad \text{(Equation 10)}$$

$$[U,S,V]=SVD(H) \qquad \text{(Equation 11)}$$

$$R=VU^T \qquad \text{(Equation 12)}$$

Here, 'H' represents familiar covariance matrix.

Post calculating the rotation, the registering module 218 may compute the translation (t) using an Equation 13, as mentioned below $$t=-R*centroid_A+centroid_B \qquad \text{(Equation 13)}$$

The registering module 218 may shift the 3D structure A to the coordinate system of the 3D structure B using the centroid, the rotation (R) and the translation (t). In an example, the 3D module 214 may calculate the rotation ($R_1$), and the translation ($T_1$) for a new 3D structure with respect to the 3D structure B using an Equation 14, as mentioned below, $$R_1=R_0*R^T \qquad \text{(Equation 14)}$$

Here, $R_0$ denotes the rotation matrix of the new 3D structure with respect to the 3D structure A, and $R^T$ denotes transpose of the rotation (R). The 3D module 214 may calculate the translation ($T_1$) using an Equation 15, as mentioned below, $$T_1=t_0+RC \qquad \text{(Equation 15)}$$

Figure 4:
FIG. 4 illustrates a registered 3D structure, in accordance with an embodiment of the present subject matter.

Where, $t_0$ denotes the translation vector of the new 3D structure with respect to the 3D structure A. Thus, the registering module 218 may register/merge the one or more 3D structures for generating the registered 3D structure as illustrated in FIG. 4, using the calculated scale correction and the rigid transformation.

Prior constructing the registered 3D structure, the optimizing module 216 may optimize the one or more 3D structures for minimizing reprojection errors associated with the 3D points. The one or more 3D structures may be optimized using a bundle adjustment technique. In an example, the optimizing module 216 may use a Levenberg-Marquardt technique as the bundle adjustment technique, for optimizing the one or more 3D structures.

In an example, 'n' 3D points are seen in 'm' views. '$X_{ij}$' denotes the projection of an $i^{th}$ point on an 'image j'. '$v_{ij}$' denotes a binary variable. The value of '$v_{ij}$' is '1' if the '3D point i' is visible in the 'image j' and the value of '$v_{ij}$' equals to '0' if the '3D point i' is not visible in the 'image j'. The 'image j' is parameterized by a vector '$a_j$' and the each '3D point i' is parameterized by a vector '$b_i$'. The bundle optimization technique optimizes the reprojection errors using an Equation 16, as mentioned below, $$Min_{a_j,b_i}\Sigma_{i=0}^{n}\Sigma_{j=1}^{m}v_{ij}d(Q(a_j,b_i),x_{ij})^2 \qquad \text{(Equation 16)}$$

Here, $Q(a_j, b_i)$ denotes predicted projection of the '3D point i' on the 'image j' and d(X, Y) denotes a Euclidean distance between the image points represented by the vector X and vector Y.

Figure 5:
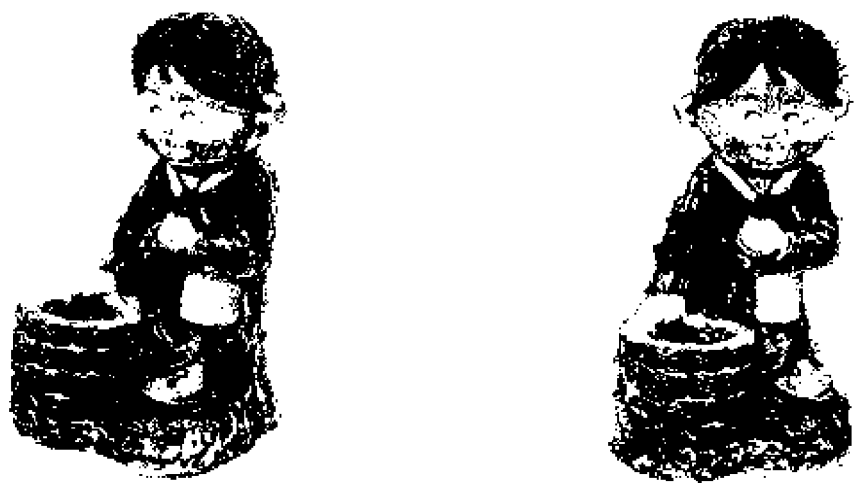
FIG. 5 illustrates a dense 3D structure, in accordance with an embodiment of the present subject matter.

In accordance with an embodiment of the present disclosure, the dense reconstructing module 220 may apply a dense reconstruction technique to the registered 3D structure, for generating the dense 3D structure as shown by FIG. 5. The dense reconstructing module 220 spreads pixels of the 3D structure and thus increases the pixel density of the image. In an example, the dense reconstructing module 220 may use a Clustering Views for Multi-View Stereo (CMVS) technique for the reconstruction of the dense 3D structure.

For example, the 3D points of the 3D structure A may be identified as structure from motion (SFM) points. The CMVS technique uses a set of images used for generating the 3D structure A, the SFM points, and associated visibility information of the SFM points, for identifying overlapping image clusters from the set of images. The overlapping image clusters are identified such that each of the SFM points may be accurately reconstructed using at least one of the image clusters. Also, the CMVS technique checks that each image of the set of images is of manageable size. The SFM points having similar visibility are identified as neighbors and are merged at first. The CMVS technique then identifies redundant images. More specifically, low resolution redundant images are identified and filtered out. Further, the images present in the set of images are divided into clusters depending on the size constraints. Finally, any newly added image is merged into the respective cluster for improving coverage of the clusters. In this manner, the pixel density of the 3D points is improved and the dense 3D structure is generated using the CMVS technique.

Figure 6A:
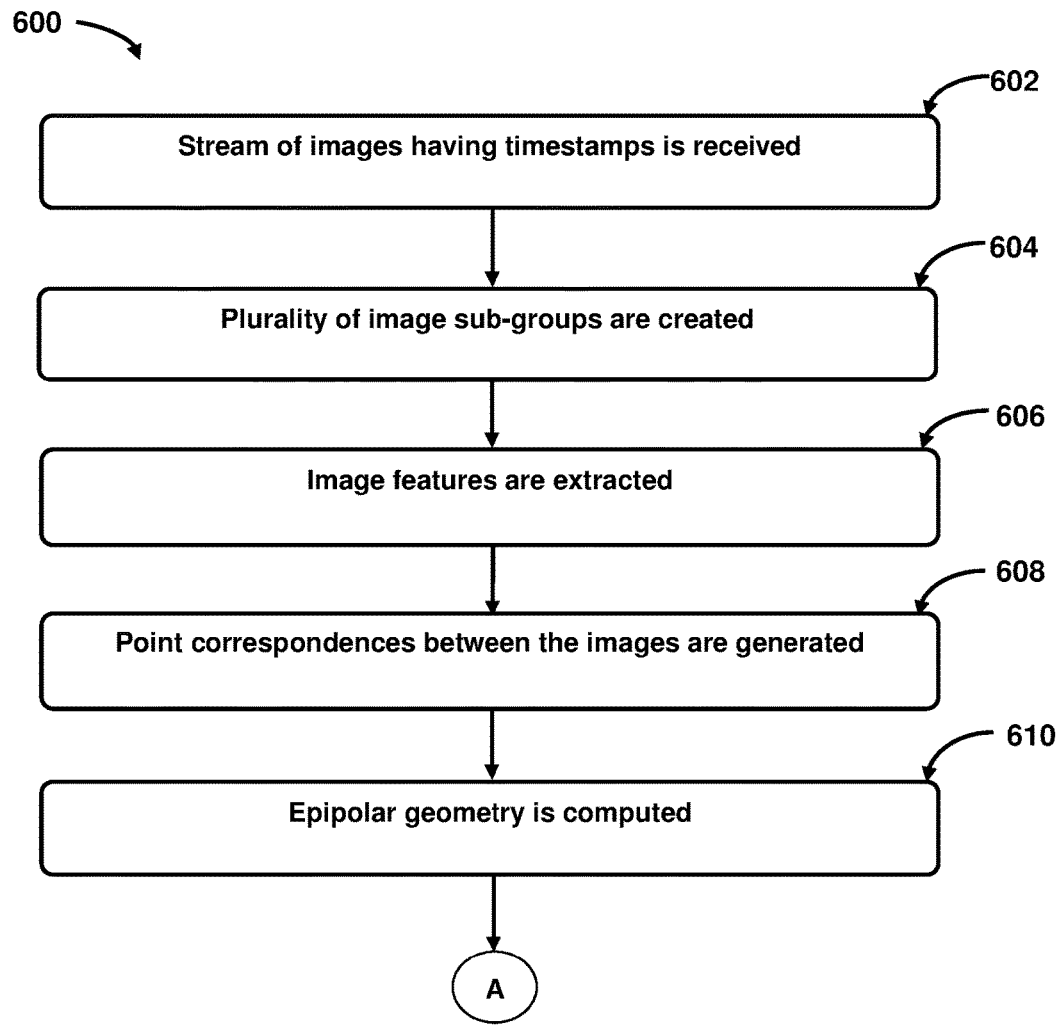
FIG. 6a and FIG. 6b jointly show a flowchart illustrating a method for constructing a 3D structure, in accordance with an embodiment of the present subject matter.
Figure 6B:
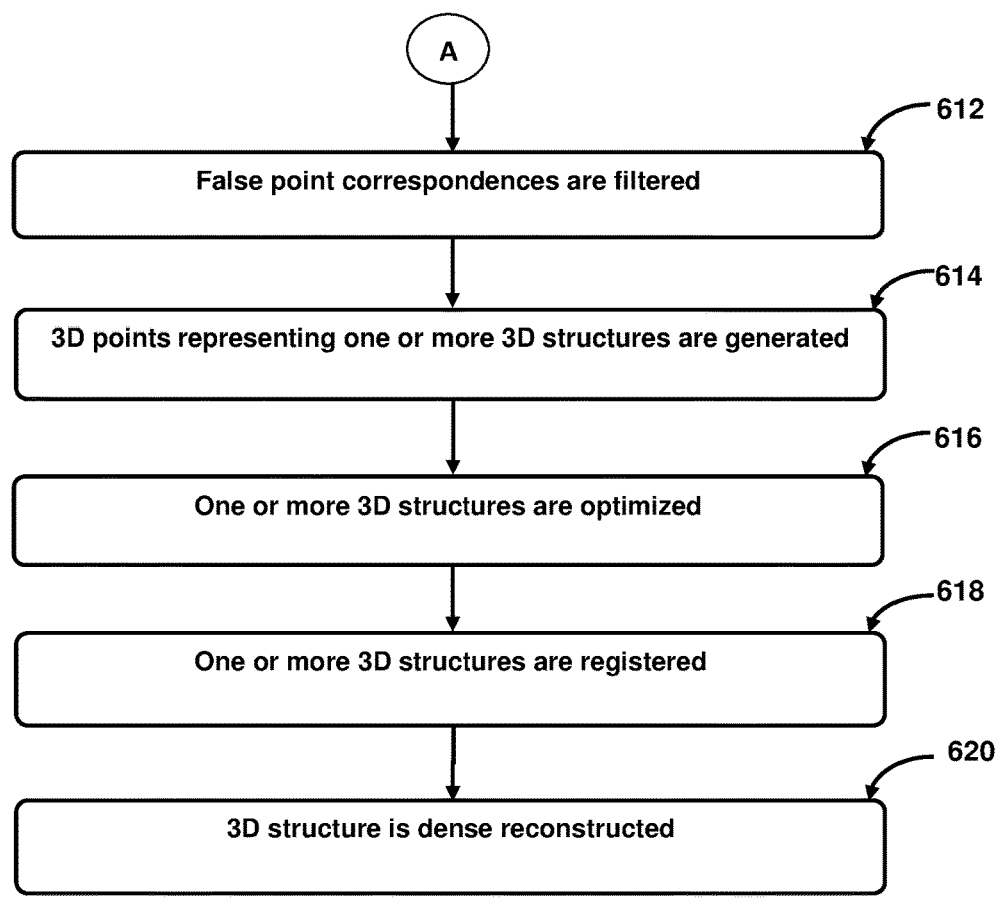

Referring now to FIG. 6a and FIG. 6b, the method for constructing a 3D structure is shown, in accordance with an embodiment of the present subject matter. The method 600 may be described in the general context of computer executable instructions. Generally, computer executable instructions can include routines, programs, objects, components, data structures, procedures, modules, functions, etc., that perform particular functions or implement particular abstract data types. The method 600 may also be practiced in a distributed computing environment where functions are performed by remote processing devices that are linked through a communications network. In a distributed computing environment, computer executable instructions may be located in both local and remote computer storage media, including memory storage devices.

The order in which the method 600 is described is not intended to be construed as a limitation, and any number of the described method blocks can be combined in any order to implement the method 600 or alternate methods. Additionally, individual blocks may be deleted from the method 600 without departing from the spirit and scope of the subject matter described herein. Furthermore, the method can be implemented in any suitable hardware, software, firmware, or combination thereof. However, for ease of explanation, in the embodiments described below, the method 600 may be considered to be implemented in the above described system 102.

At block 602, the stream of images having timestamps is received. Further, the step of receiving stream of images having timestamp may be performed by a processor.

At block 604, the plurality of image sub-groups are created. Further, the image sub-groups are created from images present in the stream of images, using the timestamps as a grouping criterion. Further, the step of creating plurality of image sub-groups is performed by the processor.

At block 606, the image features are extracted. Further the image features are extracted from the each image sub-groups. Further, the step of extracting the features of an image is performed by the processor.

At block 608, the point correspondences between the images are generated. Further, the point correspondences are generated between the images of the image sub-groups, based on the features extracted. The point correspondences include inliers and outliers. Further, the step of generating the point correspondences between the images is performed by the processor.

At block 610, the epipolar geometry is computed. Further, the computation of the epipolar geometry involves computing an essential matrix and a fundamental matrix. Further, the step of computing the epipolar geometry is performed by the processor.

At block 612, the false point correspondences are filtered. Further, the false point correspondences include outliers. Further, the step of filtering the false point correspondences is performed by the processor.

At block 614, the 3D points representing the one or more 3D structures are generated, using the filtered point correspondences. Further, the step of generating the 3D points representing the one or more 3D structures is performed by the processor.

At block 616, the one or more 3D structures are optimized. Further, the one or more 3D structures are optimized for eliminating reprojection errors associated with the 3D points. Further, the step of optimizing the one or more 3D structures is performed by the processor.

At block 618, the one or more 3D structures are registered for generating a registered 3D structure. Further, the step of registering the one or more 3D structures is performed by the processor.

At block 620, the registered 3D structure is dense reconstructed for improving pixel density of the registered 3D structure. Further, the step of dense reconstructing the registered 3D structure may be performed by the processor.

Although implementations for constructing the 3D structure have been described in language specific to structural features and/or methods, it is to be understood that the appended claims are not necessarily limited to the specific features or methods described. Rather, the specific features and methods are disclosed as examples of implementations for monitoring the user activities on the software application external to an organization.

The invention claimed is:

1. A method for constructing a 3D structure, the method comprising:
   receiving, by a processor, a stream of images captured from a plurality of viewpoints, wherein the stream of images has timestamps associated;
   creating, by the processor, a plurality of image sub-groups from the stream of images based upon the timestamps;
   extracting, by the processor, features from an image sub-group of the plurality of image sub-groups;
   generating, by the processor, point correspondences between images present in the image sub-group based upon the features;
   computing, by the processor, epipolar geometry of the image sub-group, wherein the epipolar geometry describes a geometric relationship between the images captured from one or more views;
   filtering, by the processor, false point correspondences from the point correspondences using the epipolar geometry to generate filtered point correspondences; and generating, by the processor, 3D points by employing a triangulation technique on the filtered point correspondences, wherein the 3D points represent one or more 3D structures.

2. The method of claim 1, wherein the stream of images is captured by a user device upon determining a motion of the user device, and wherein the motion is determined by using an accelerometer embedded in the user device.

3. The method of claim 1, wherein the plurality of image sub-groups comprises images having timestamps within a predefined range of time.

4. The method of claim 1, wherein the features from the image sub-group are extracted using a technique selected from a group consisting of Scale Invariant Feature Transform (SIFT), Speeded Up Robust Features (SURF), Gradient Location and Orientation Histogram (GLOH), and Histogram of Oriented Gradients (HOG).

5. The method of claim 1, wherein the point correspondences are indicative of the features common between the images present in the image sub-group.

6. The method of claim 1, wherein the epipolar geometry is computed for each image sub-group in parallel, wherein the epipolar geometry of the image sub-groups comprises a fundamental matrix and an essential matrix, wherein the fundamental matrix and the essential matrix comprise a rotation element and a translation element, and wherein the essential matrix is computed based on the fundamental matrix.

7. The method of claim 1, further comprises optimizing the one or more 3D structures for minimizing reprojection errors associated with the 3D points, and wherein the one or more 3D structures are optimized using a bundle adjustment technique.

8. The method of claim 1, further comprises registering the one or more 3D structures to generate a registered 3D structure, wherein the registered 3D structure is generated based upon a scale correction and a rigid transformation between the one or more 3D structures, and wherein the rigid transformation involves calculation of a rotation, a translation, and a centroid.

9. A system for constructing a 3D structure, the system comprises:
a processor 202;
a memory 206 coupled to the processor 202, wherein the processor is capable for executing a plurality of modules 208 stored in the memory, and wherein the plurality of modules 208 comprises:
an imaging module configured to:
receive a stream of images captured from a plurality of viewpoints, wherein the stream of images has timestamps associated;
create a plurality of image sub-groups from the stream of images based upon the timestamps; and
extract features from an image sub-group of the plurality of image sub-groups;
a correspondence generating and filtering module configured to:
generate point correspondences between the images present in the image sub-group based upon the features;
compute epipolar geometry of the image sub-group, wherein the epipolar geometry describes a geometric relationship between the images captured from one or more views; and
filter false point correspondences from the point correspondences using the epipolar geometry to generate filtered point correspondences; and a 3D module, wherein the 3D module generates 3D points by employing a triangulation technique on the filtered point correspondences, wherein the 3D points represent one or more 3D structures.

10. The system of claim 9, wherein the stream of images is captured by a user device upon determining a motion of the user device, and wherein the motion is determined by using an accelerometer embedded in the user device.

11. The system of claim 9, wherein the plurality of image sub-groups comprises images having timestamps within a predefined range of time.

12. The system of claim 9, wherein the features from the image sub-group are extracted using a technique selected from a group consisting of Scale Invariant Feature Transform (SIFT), Speeded Up Robust Features (SURF), Gradient Location and Orientation Histogram (GLOH), and Histogram of Oriented Gradients (HOG).

13. The system of claim 9, wherein the epipolar geometry is computed for each image sub-group in parallel, wherein the epipolar geometry of the image sub-groups comprises a fundamental matrix and an essential matrix, wherein the fundamental matrix and the essential matrix comprise a rotation element and a translation element, and wherein the essential matrix is computed based on the fundamental matrix.

14. The system of claim 9 further comprises an optimizing module for optimizing the one or more 3D structures for minimizing reprojection errors associated with the 3D points, and wherein the one or more 3D structures are optimized using a bundle adjustment technique.

15. The system of claim 9, further comprises a registering module for registering the one or more 3D structures and generating a registered 3D structure, wherein the one or more 3D structures are registered based upon a scale correction and a rigid transformation between the one or more 3D structures, and wherein the rigid transformation involves calculation of a rotation, a translation, and a centroid.

16. A non-transitory computer readable medium embodying a program executable in a computing device for constructing a 3D structure, the program comprising:
a program code for receiving a stream of images captured from a plurality of viewpoints, wherein the stream of images has timestamps associated;
a program code for creating a plurality of image sub-groups from the stream of images based upon the timestamps;
a program code for extracting features from an image sub-group of the plurality of image sub-groups;
a program code for generating point correspondences between the images present in the image sub-group based upon the features;
a program code for computing epipolar geometry of the image sub-group, wherein the epipolar geometry describes a geometric relationship between the images captured from one or more views;
a program code for filtering false point correspondences from the point correspondences using the epipolar geometry to generate filtered point correspondences; and
a program code for generating 3D points by employing a triangulation technique on the filtered point correspondences, wherein the 3D points represent one or more 3D structures.

* * * * *